(12) United States Patent
Tang et al.

(10) Patent No.: US 7,660,056 B1
(45) Date of Patent: Feb. 9, 2010

(54) LENS BARREL

(75) Inventors: Tony K. Tang, Glendale, CA (US); Roman C. Gutierrez, Arcadia, CA (US); Robert J. Calvet, Pasadena, CA (US); Jing Xu, Irvine, CA (US); Eric R. Fossum, Wolfeboro, NH (US)

(73) Assignee: Siimpel Corporation, Arcadia, CA (US)

( * ) Notice: Subject to any disclaimer, the term of this patent is extended or adjusted under 35 U.S.C. 154(b) by 0 days.

(21) Appl. No.: 12/030,704

(22) Filed: Feb. 13, 2008

Related U.S. Application Data

(60) Division of application No. 11/364,099, filed on Feb. 28, 2006, now Pat. No. 7,345,827, and a continuation-in-part of application No. 11/361,608, filed on Feb. 24, 2006.

(60) Provisional application No. 60/657,261, filed on Feb. 28, 2005.

(51) Int. Cl.
*G02B 7/02* (2006.01)
(52) U.S. Cl. .................. 359/824; 359/808; 359/830
(58) Field of Classification Search ............... 359/824, 359/811, 819, 808, 818, 829, 827, 828, 830
See application file for complete search history.

(56) References Cited

U.S. PATENT DOCUMENTS

| | | | |
|---|---|---|---|
| 3,817,601 A | 6/1974 | Colaiace et al. | |
| 4,053,211 A | 10/1977 | Momiyama | |
| 5,249,082 A * | 9/1993 | Newman | 359/813 |
| 5,285,313 A | 2/1994 | Kobayashi et al. | |
| 5,471,100 A * | 11/1995 | Sakamoto et al. | 310/12 |
| 5,768,038 A | 6/1998 | Emura | |
| 5,926,326 A | 7/1999 | Fischer et al. | |
| 6,268,970 B1 | 7/2001 | Ito et al. | |
| 6,738,198 B2 | 5/2004 | Kashiwaba et al. | |
| 2001/0048557 A1 | 12/2001 | Akami et al. | |
| 2005/0225824 A1 | 10/2005 | Bell et al. | |
| 2005/0249487 A1 | 11/2005 | Gutierrez | |
| 2006/0109668 A1* | 5/2006 | Schmieder et al. | 362/455 |
| 2006/0245085 A1 | 11/2006 | Lee et al. | |

* cited by examiner

*Primary Examiner*—Scott J Sugarman
*Assistant Examiner*—Dawayne A Pinkney
(74) *Attorney, Agent, or Firm*—Haynes and Boone, LLP

(57) ABSTRACT

An improved lens barrel and related methods are provided. For example, in accordance with an embodiment of the present invention, a lens barrel includes a housing comprising a first section having a first diameter and a second section having a second diameter. A first lens element having a diameter approximately equal to the first diameter of the first section is enclosed by the first section of the housing. A second lens element is provided having a diameter approximately equal to the second diameter of the second section.

10 Claims, 8 Drawing Sheets

LENS BARREL

CROSS-REFERENCE TO RELATED APPLICATIONS

This application is a divisional application of U.S. patent application Ser. No. 11/364,099 filed on Feb. 28, 2006 now U.S. Pat. No. 7,345,827 entitled "Lens Barrel" which claims the benefit of U.S. Provisional Patent Application No. 60/657,261 filed on Feb. 28, 2005 entitled "Autofocus Camera". U.S. patent application Ser. No. 11/364,099 is also a continuation-in-part application of U.S. patent application Ser. No. 11/361,608 filed on Feb. 24, 2006 entitled "Autofocus Camera". All of the above-identified applications are hereby incorporated by reference.

BACKGROUND

1. Field of the Invention

The present invention generally relates to optics and, more particularly, to lens barrel structures that are suitable for use with miniature cameras.

2. Related Art

Cameras often employ one or more lens elements to provide focusing or zooming features. Typically, the lens elements are located in a lens barrel that is positioned in proximity to an imager. Light received through the camera's aperture can be transmitted through the various lens elements of the lens barrel and focused on the imager.

In products such as digital cameras and other personal electronic devices, it is often important to utilize space and materials efficiently in order to allow the products to be miniaturized, as well as to reduce weight. As product sizes become smaller, efficient utilization of space and materials becomes increasingly important.

FIG. 1 illustrates a perspective view of a lens mount 420 engaging a lens barrel 110. FIG. 2 illustrates a cross-sectional side view of lens mount 420 separated from lens barrel 110. As illustrated, lens barrel 110 includes a housing 180. A plurality of lens elements 160 and a larger last lens element 170 are provided in lens barrel 180 and enclosed by housing 180. Housing 180 is sized of a substantially uniform diameter D1 which accommodates the largest lens within the barrel. Accordingly, diameter D1 is approximately equal to the diameter of last lens element 170.

Lens mount 420 has a ring portion 450 having an interior surface 490 as well as a substantially circular interior space 410. As illustrated, ring portion 450 has an exterior diameter D6 and an interior diameter approximately equal to diameter D1 of housing 180 of lens barrel 110. A plurality of threads 185 are provided on an external surface of housing 180 for engaging threads on interior surface 490 of lens mount 420. Raised portions 195 of housing 180 may be provided to secure housing 180 of lens barrel 110 against ring portion 450 after lens barrel 110 has been inserted into lens mount 420. Raised portions 195 may be provided on a right end of housing 180 (as illustrated in FIG. 2) or on a left end of housing 180 (not shown). As a result, lens barrel 110 may be inserted into lens mount 420 through interior space 410, allowing lens mount 420 to engage lens barrel 110 and secure lens barrel 110 to lens mount 420.

Unfortunately, lens barrel 110 fails to provide efficient utilization of space. In particular, although lens barrel 110 is sized with uniform diameter D1 to accommodate last lens element 170, it is nevertheless oversized with respect to lens elements 160. As a result, excess spaces 190 are formed between lens elements 160 and housing 180. These excess spaces 190 can cause exterior dimensions of lens barrel 110 and lens mount 420 to be unnecessarily large, resulting in less efficient utilization of space, and impeding the miniaturization of products in which lens barrel 110 is employed. Additional material may also be necessary to stabilize lens elements 160 within excess spaces 190, thereby contributing to excess weight.

Accordingly, there is a need for an improved approach to lens barrel design that overcomes the deficiencies discussed above. In particular, there is a need to provide an improved lens barrel design that provides efficient utilization of space and reduced weight when employed in miniature digital cameras and personal electronic devices.

SUMMARY

In accordance with one embodiment of the present invention, a lens barrel includes: a housing comprising a first section having a first diameter and a second section having a second diameter; a first lens element having a diameter approximately equal to the first diameter of the first section, wherein the first lens element is enclosed by the first section of the housing; and a second lens element having a diameter approximately equal to the second diameter of the second section.

In accordance with another embodiment of the present invention, a camera includes: a lens barrel comprising: a housing comprising a first section having a first diameter and a second section having a second diameter, a first lens element having a diameter approximately equal to the first diameter of the first section, wherein the first lens element is enclosed by the first section of the housing, and a second lens element having a diameter approximately equal to the second diameter of the second section; a stage; a lens mount adapted to secure the first section of the lens barrel relative to the stage; an imager; and an actuator adapted to move the lens barrel relative to the imager.

In accordance with another embodiment of the present invention, a method of forming an image includes: providing a lens barrel, wherein the lens barrel comprises: a housing comprising a first section having a first diameter and a second section having a second diameter, a first lens element having a diameter approximately equal to the first diameter of the first section, wherein the first lens element is enclosed by the first section of the housing, and a second lens element having a diameter approximately equal to the second diameter of the second section; and translating the lens barrel relative to an imager.

In accordance with another embodiment of the present invention, a lens barrel includes: a plurality of cylindrical segments; a plurality of connecting members associated with each of the segments; and a plurality of apertures associated with each of the segments and corresponding to the connecting members.

In accordance with another embodiment of the present invention, a lens carrier includes: a base portion having a substantially-semicircular cross section; a plurality of lens elements; and a plurality of holding members located on a top surface of the base portion and adapted to engage the lens elements.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodi-

BRIEF DESCRIPTION OF THE FIGURES

Like element numbers in different figures represent the same or similar elements.

DETAILED DESCRIPTION

Figure 1:
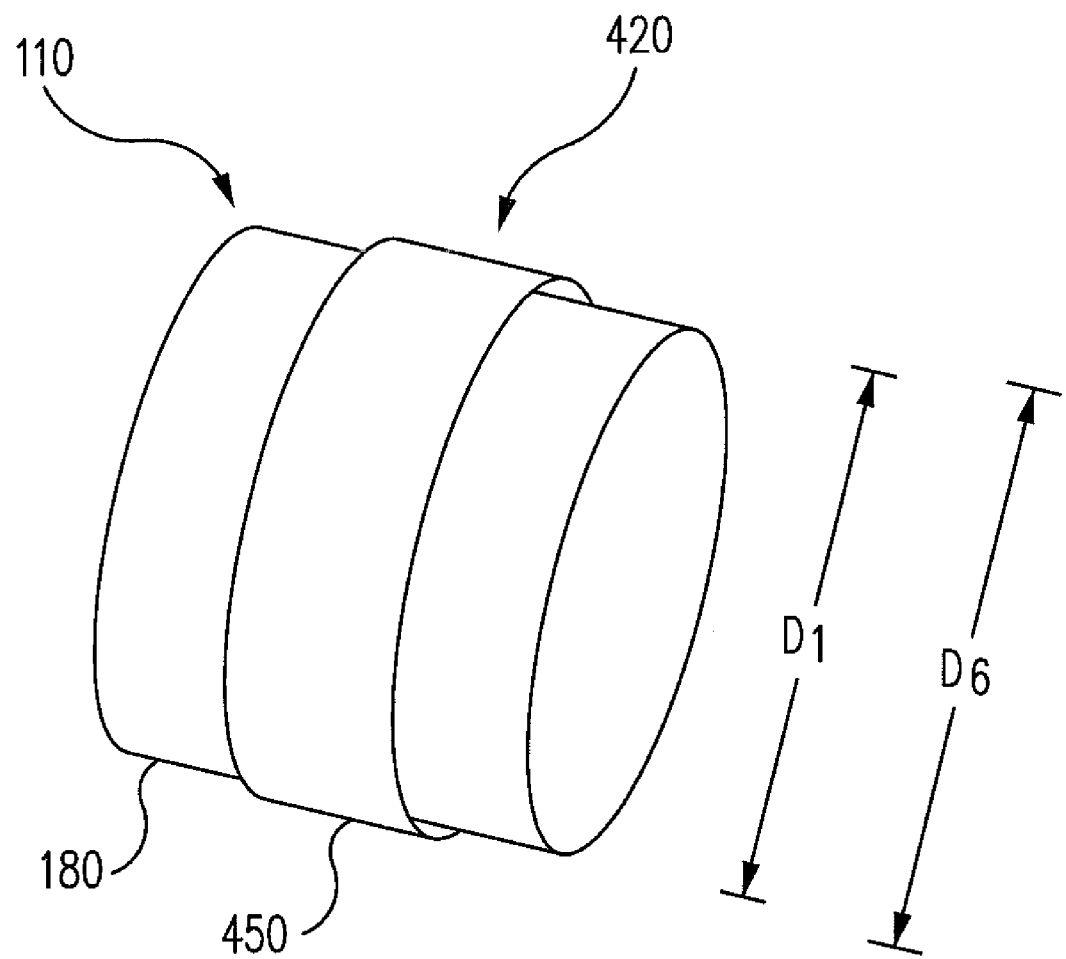
FIG. 1 illustrates a perspective view of a lens mount in accordance with an embodiment of the present invention engaging a lens barrel.
Figure 2:
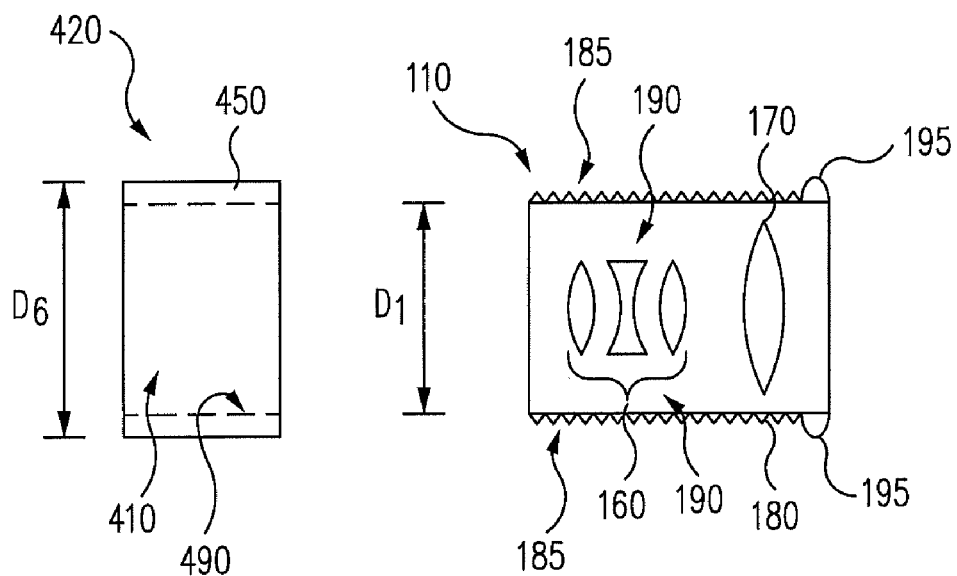
FIG. 2 illustrates a cross-sectional side view of a lens mount in accordance with an embodiment of the present invention and a lens barrel.
Figure 3:
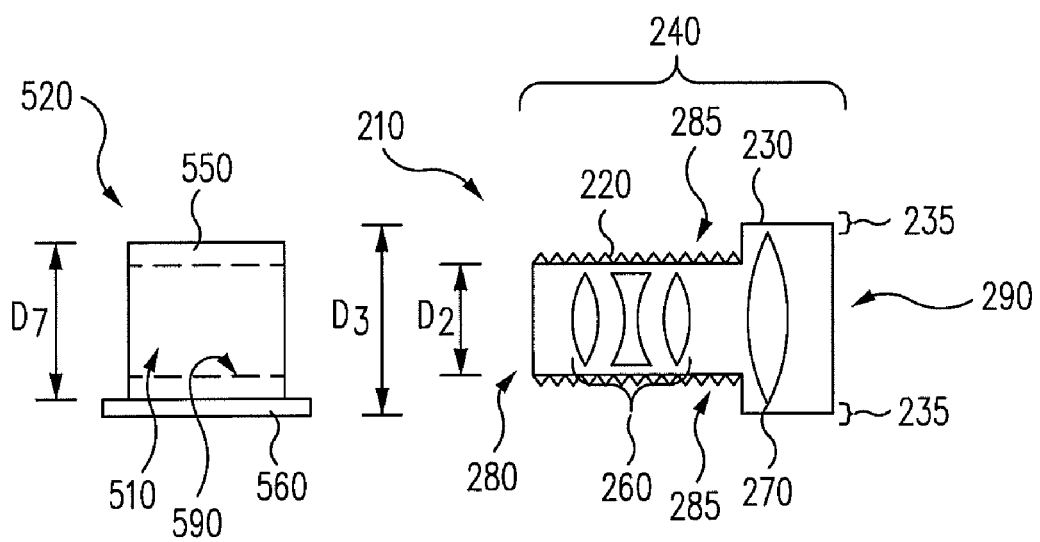
FIG. 3 illustrates a cross-sectional side view of a lens mount and a lens barrel in accordance with an embodiment of the present invention.

FIG. 3 illustrates a cross-sectional side view of a lens mount 520 and a lens barrel 210 in accordance with an embodiment of the present invention. As illustrated, lens barrel 210 includes a housing 240 having a non-uniform diameter. In particular, housing 240 includes a first section 220 having a diameter D2, and a second section 230 having a diameter D3. In various embodiments, one or both of first and second sections 220 and 230, respectively, of housing 240 may be cylindrical.

A plurality of lens elements 260 as well as a larger last lens element 270 are provided in lens barrel 210 and are enclosed by housing 240. Lens elements 260 may include any desired number of lens elements. In one embodiment, lens elements 260 include 2 to 6 lens elements. As illustrated, lens elements 260 are enclosed by first section 220 and have a diameter approximately equal to diameter D2 of first section 220. Last lens element 270 is enclosed by second section 230 and has a diameter approximately equal to diameter D3 of second section 230.

Diameters D2 and D3 can be implemented in accordance with sizes appropriate for digital cameras and other personal electronic devices. In one embodiment, diameter D2 is in the range of approximately 2 mm to approximately 7 mm. In another embodiment, diameter D3 is in the range of approximately 4 mm to approximately 8 mm.

One or more of lens elements 260 and last lens element 270 can be implemented as spherical lenses, aspherical lenses, and/or any other type of lens appropriate for use in digital cameras. For example, in one embodiment, lens elements 260 can be implemented as spherical lenses and last lens element 270 can be implemented as an aspherical lens providing compensation for optical imperfections introduced by the spherical lenses.

FIG. 3 further illustrates lens mount 520 having a ring portion 550 with an interior surface 590 as well as a substantially circular interior space 510. Ring portion 550 may be implemented with an exterior diameter D7 as well as an interior diameter approximately equal to diameter D2 of first section 220 of housing 240. A plurality of threads 285 can be provided on an external surface of first section 220 of housing 240 for engaging threads on interior surface 590 of lens mount 520. As a result, first section 220 of housing 240 may be inserted into lens mount 520 through interior space 510, allowing lens mount 520 to engage lens barrel 210 and secure lens barrel 210 to lens mount 520. Lens mount 520 also has a base portion 560 that may be engaged with a portion of a digital camera.

It will be appreciated that by implementing first section 220 with diameter D2 smaller than diameter D1 of lens mount 420, the interior and exterior diameters D2 and D7 of lens mount 520 can also be reduced in comparison with diameters D1 and D6 of lens mount 420. Various features of lens barrel 210 and lens mount 520 can be further ascertained from the perspective view provided in FIG. 5 of the present disclosure.

Figure 4:
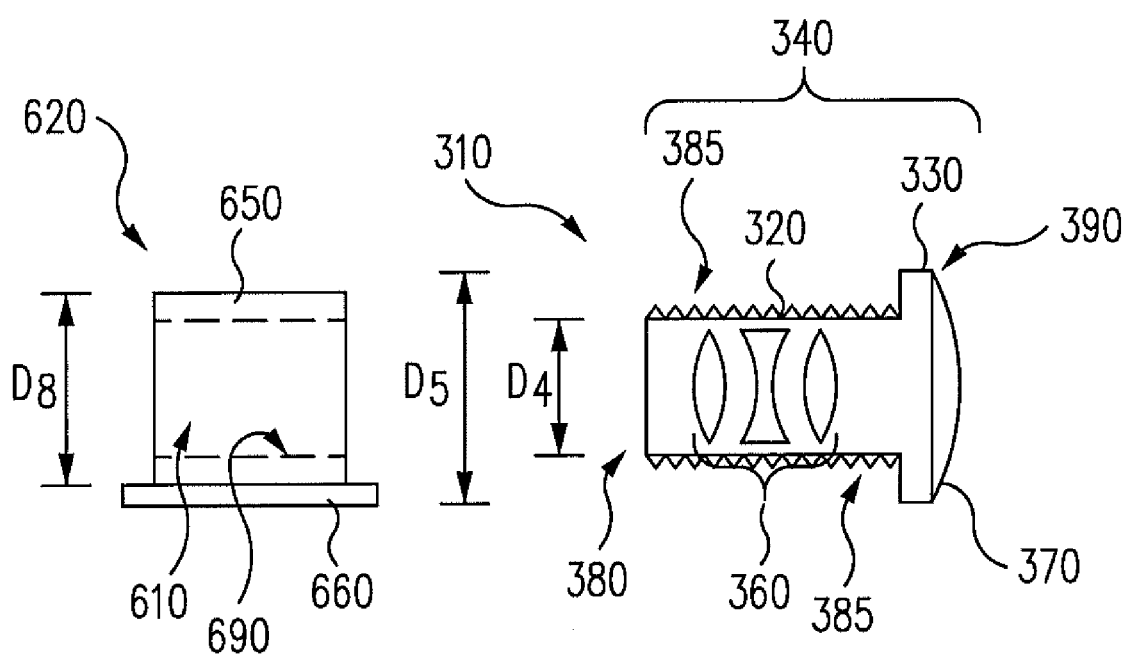
FIG. 4 illustrates a cross-sectional side view of a lens mount and a lens barrel in accordance with another embodiment of the present invention.

FIG. 4 illustrates a cross-sectional side view of a lens mount 620 and a lens barrel 310 in accordance with another embodiment of the present invention. As illustrated, lens barrel 310 includes a housing 340 having a non-uniform diameter. In particular, housing 340 includes a first section 320 having a diameter D4, and a second section 330 having a diameter D5. In various embodiments, one or both of first and second sections 320 and 330, respectively, of housing 340 may be cylindrical.

A plurality of lens elements 360 as well as a larger last lens element 370 are provided in lens barrel 310 and enclosed by housing 340. In one embodiment, lens elements 360 may be implemented in accordance the numbers of lenses previously described herein with respect to lens elements 260 of FIG. 3.

As illustrated, lens elements 360 are enclosed by first section 320 and have a diameter approximately equal to diameter D4 of first section 320. Last lens element 370 is secured to an end of second section 330 of housing 340 at a back end 390 of lens barrel 310. In various embodiments, last lens element 370 can be secured to second section 330 in a variety of ways including, but not limited to: glue, thermal exposure, ultrasonic welding, laser welding, UV tacking, mechanical engagement, or other ways as may be appropriate in particular applications.

Because last lens element 370 is secured to an end of second section 330 of housing 340, it need not be entirely enclosed by second section 330. Accordingly, dimension D5 of second section 330 of housing 340, as well as the weight of housing 340, can be reduced. In particular, diameter D5 can be reduced in comparison with diameter D3 of FIG. 3. For example, diameter D5 can be reduced by an amount approximately equal to dimensions 235 of FIG. 3 which, in one embodiment, may correspond to the thickness of housing 240 and/or housing 340.

Diameters D4 and D5 can be implemented in accordance with sizes appropriate for digital cameras and other personal electronic devices. In one embodiment, diameters D4 and D5 may be implemented using the ranges described herein with respect to diameters D2 and D3, respectively. One or more of lens elements 360 and last lens element 370 can be implemented as spherical lenses, aspherical lenses, and/or any other type of lens appropriate for use in digital cameras as described herein with respect to lens elements 260 and last lens element 270.

FIG. 4 further illustrates lens mount 620 having a ring portion 650 with an interior surface 690 as well as a substantially circular interior space 610. Ring portion 650 may be implemented with an exterior diameter D8 as well as an interior diameter approximately equal to diameter D4 of first section 320 of housing 340. A plurality of threads 385 can be provided on an external surface of first section 320 of housing 340 for engaging threads on interior surface 690 of lens mount 620. As a result, first section 320 of housing 340 may be inserted into lens mount 620 through interior space 610, allowing lens mount 620 to engage lens barrel 310 and secure lens barrel 310 to lens mount 620. Lens mount 620 also has a base portion 660 that may be engaged with a portion of a digital camera.

It will be appreciated that by implementing first section 320 with diameter D4 smaller than diameter D1 of lens mount 420, the interior and exterior diameters D4 and D8 of lens mount 620 can also be reduced in comparison with diameters D1 and D6 of lens mount 420, respectively.

As illustrated in FIGS. 3 and 4, the implementation of lens barrels 210 and 310 using different diameters D2/D4 and D3/D5 for first and second sections 220/320 and 230/330, respectively, allows for lens barrels 210 and 310 to be implemented without excess spaces 190 as previously described with respect to lens barrel 110. As a result, the size of lens barrels 210 and 310 can be reduced, thereby allowing newly available spaces above and below first sections 220 and 320 to be used for other purposes, or allowing further miniaturization of a digital camera or other personal electronic device in which lens barrels 210 and 310 are employed. In addition, less material can be used to stabilize lens elements 260 and 360 within first sections 220 and 320, thereby reducing the weight of lens barrels 210 and 310.

Figure 5:
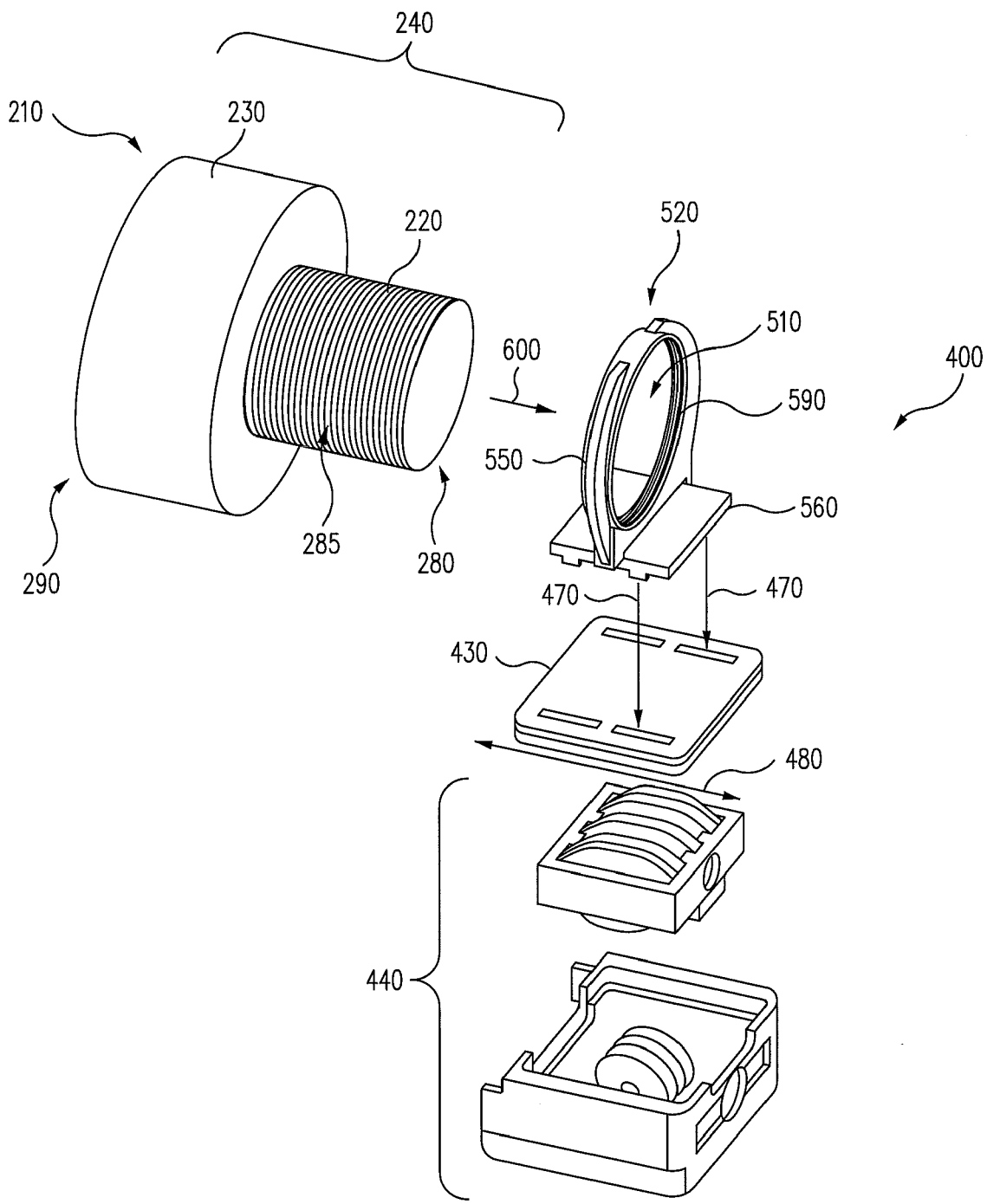
FIG. 5 illustrates a perspective view of components of a digital camera that may be used with a lens barrel in accordance with an embodiment of the present invention.

FIG. 5 illustrates a perspective view of various components 400 of a digital camera that may be used with lens barrel 210 in accordance with an embodiment of the present invention. As illustrated, components 400 can include lens mount 520, a stage 430, and an actuator 440. It will be appreciated that the descriptions of lens barrel 210 and lens mount 520 with respect to FIG. 5 can also be applied to lens barrel 310 and lens mount 620, respectively. Moreover, lens barrel 310 and lens mount 620 may be substituted for lens barrel 210 and lens mount 520 in FIG. 5 where desired.

Lens barrel 210 may be inserted into interior space 510 in the direction of arrow 600 and engaged with ring portion 550 in any desired fashion in order to secure lens barrel 210 within ring portion 550. For example, in one embodiment, interior surface 590 of ring portion 550 may be threaded to engage complementary threads on exterior surfaces of first section 220 of lens barrel 210.

Base portion 560 of lens mount 520 may be engaged with stage 430 as indicated by arrows 470. As a result of the engagement between first section 220 of lens barrel 210 with ring portion 550 of lens mount 520, and the engagement of base portion 560 with stage 430, the position of lens barrel 210 can be fixed relative to stage 430.

Stage 430 is a movable stage capable of being translated in a plurality of directions by actuator 440. For example, actuator 440 can cause stage 430 to move forward or backward in the directions denoted by arrows 480 in response to signals provided by appropriate control circuitry. Actuator 440 can be implemented in accordance with any appropriate mechanism for providing controlled movements on a scale appropriate for miniature digital cameras. For example, in various embodiments, actuator 440 can be implemented using a Lorentz motor, a micro-electro-mechanical systems (MEMS) device, or other appropriate apparatus.

In use, back end 290 of lens barrel 210 can be situated in proximity to an imager of a digital camera while engaged with lens mount 520. Light received at front end 280 of lens barrel 210 is passed through lens elements 260 and last lens element 270, and can be received by the imager. It will be appreciated that lens barrel 210 can be configured to operate with an imager implemented using any appropriate technology for capturing digital images formed on the imager, such as charge-coupled device (CCD) or complimentary metal-oxide semiconductor (CMOS) technology. The images can be focused and/or zoomed by translating lens barrel 210 relative to the imager in the directions denoted by arrows 480 through operation of actuator 440.

Figure 6:
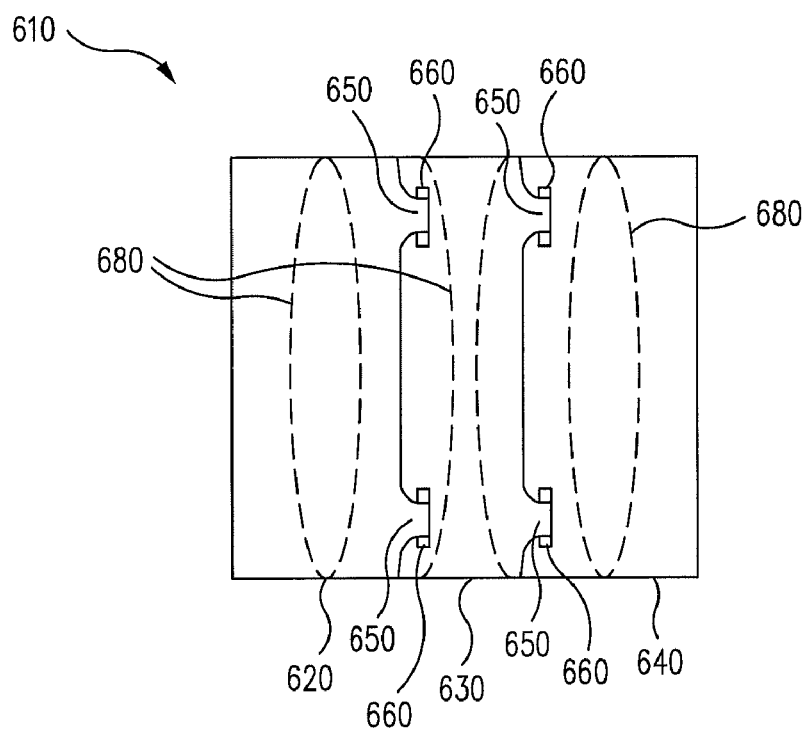
FIG. 6 illustrates a side view of a lens barrel in accordance with an embodiment of the present invention.

FIG. 6 illustrates a side view of a lens barrel 610 in accordance with an embodiment of the present invention. Lens barrel 610 includes cylindrical segments 620, 630, and 640 joined together by the engagement of a plurality of connecting members 650 with a plurality of corresponding apertures 660. Connecting members 650 and apertures 660 can be implemented to interlock with each other in order that segments 620, 630, and 640 may remain connected in the form of lens barrel 610. A lens element 680 (illustrated by dashed lines) may be mounted in each of segments 620, 630, and 640. In one embodiment, one or more of segments 620, 630, and 640 may be perforated in order to reduce the weight of lens barrel 610.

Figure 7:
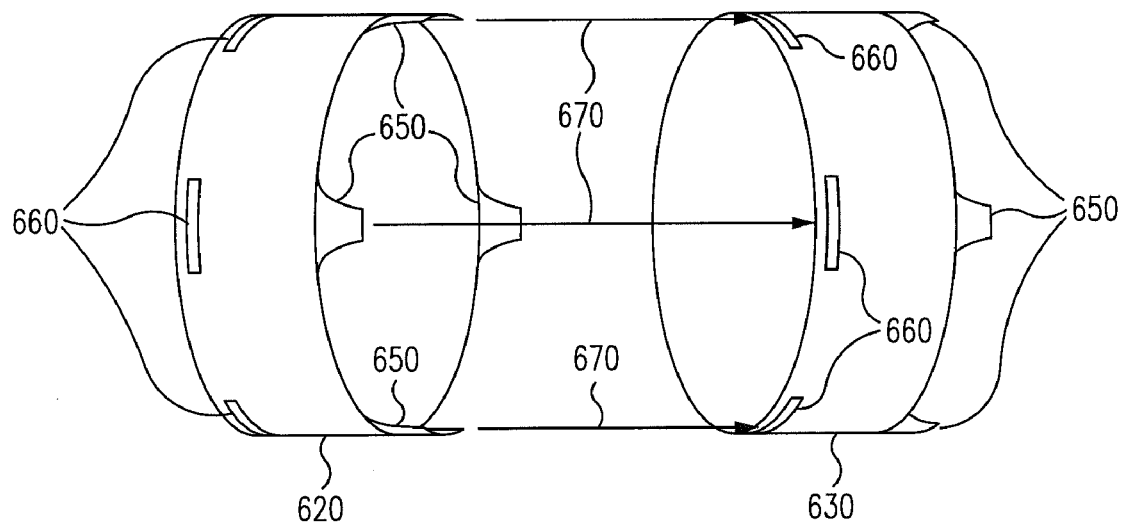
FIG. 7 illustrates an exploded view of a portion of the lens barrel of FIG. 6 in accordance with an embodiment of the present invention.

FIG. 7 illustrates an exploded view of segments 620 and 630 in accordance with an embodiment of the present invention. For purposes of illustration, lens elements 680 are not shown in FIG. 7. As identified in FIG. 7, connecting members 650 can be distributed about the circumference of the segments, and apertures 660 can be provided on external surfaces of the segments to receive connecting members 650. As a result, connecting members 650 can be moved in the direction of arrows 670 to engage apertures 660.

Figure 8:
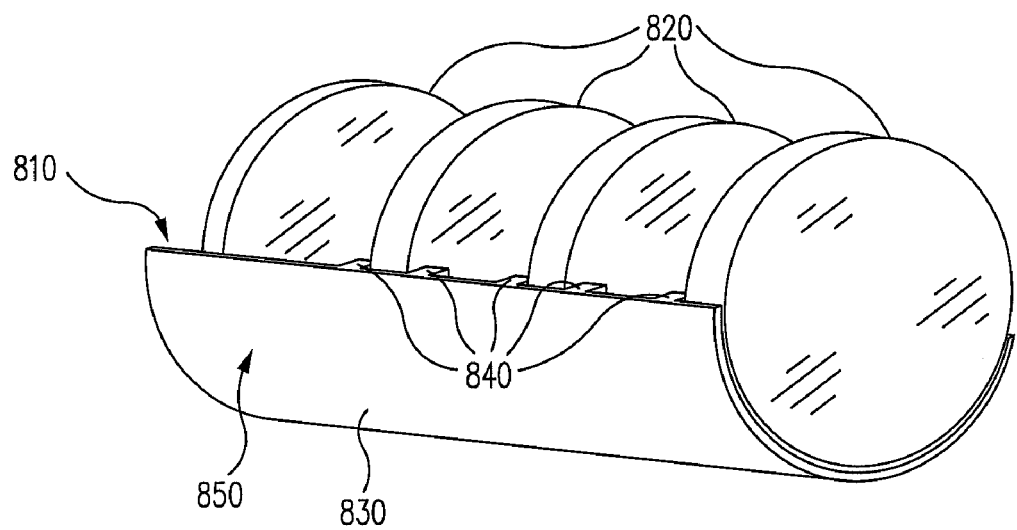
FIG. 8 illustrates a perspective view of a lens carrier in accordance with an embodiment of the present invention.
Figure 9:
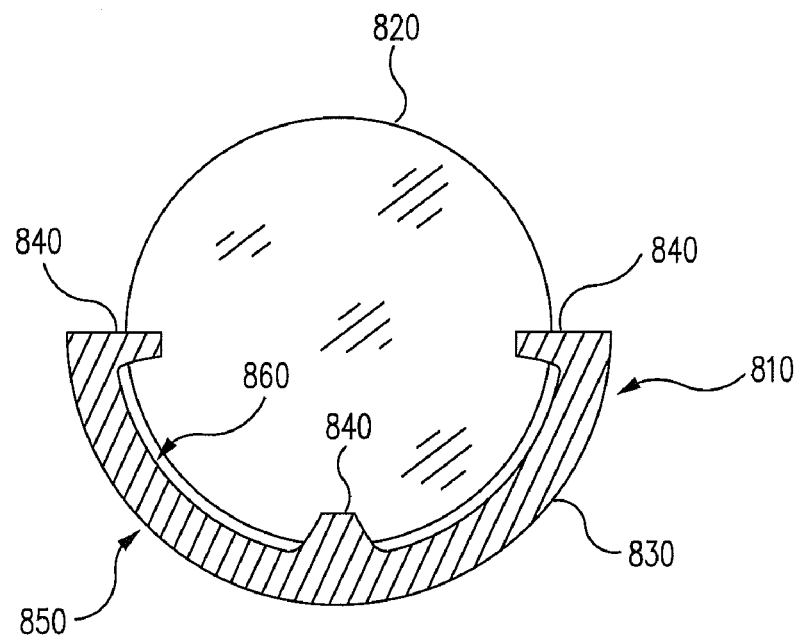
FIG. 9 illustrates a front view of the lens carrier of FIG. 8 in accordance with an embodiment of the present invention.
Figure 10:
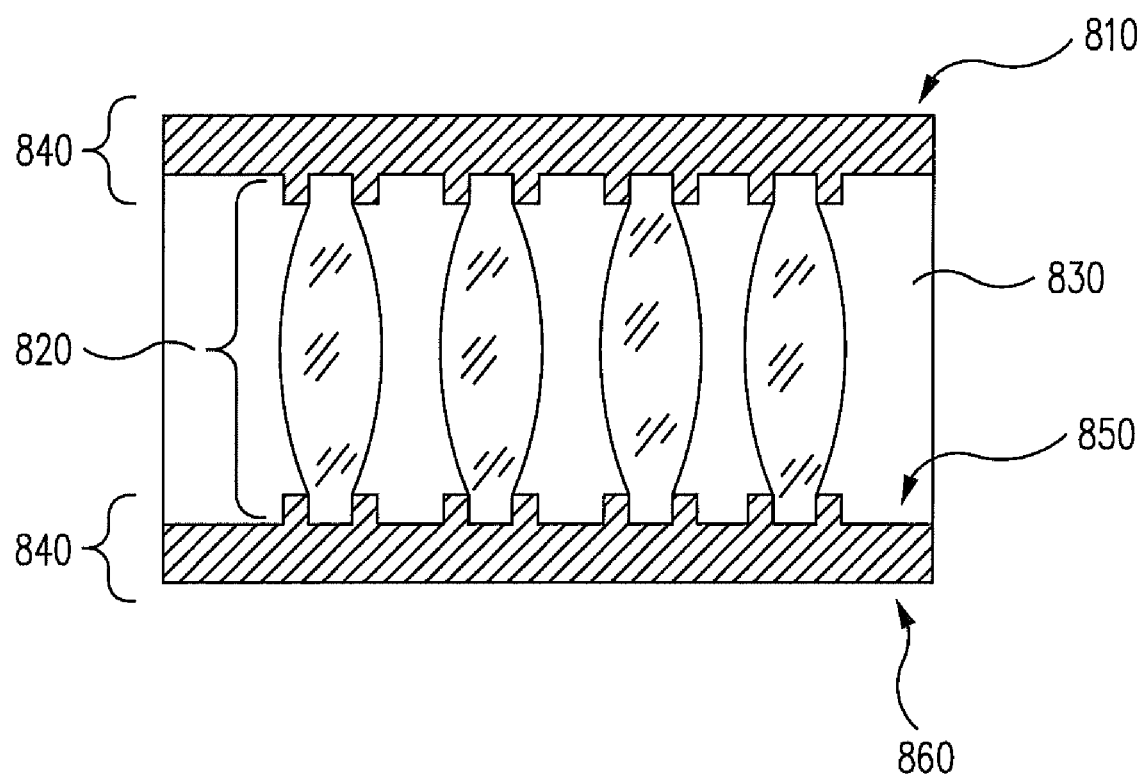
FIG. 10 illustrates a top view of the lens carrier of FIG. 8 in accordance with an embodiment of the present invention.

FIGS. 8, 9, and 10 illustrate perspective, front, and top views, respectively, of a lens carrier 810 in accordance with an embodiment of the present invention. Lens carrier 810 includes a base portion 830 and a plurality of holding members 840 located on a top 860 surface of base portion 830. A plurality of lens elements 820 are held by lens carrier 810 through the engagement of holding members 840 with lens elements 820.

As illustrated, base portion 830 is curved, exhibiting a substantially-semicircular cross section. In one embodiment, base portion 830 is implemented as a portion of a cylinder, such as a portion of a cylindrical lens barrel. In this regard, it will be appreciated that by using lens carrier 810 to hold lens elements 820, weight and materials costs can be reduced in comparison to known lens barrel structures. It will also be appreciated that a bottom surface 850 of base portion 830 may be engaged with a mount (not shown) as may be desired to use lens carrier 830 with a digital camera or other personal electronic device.

Figure 11:
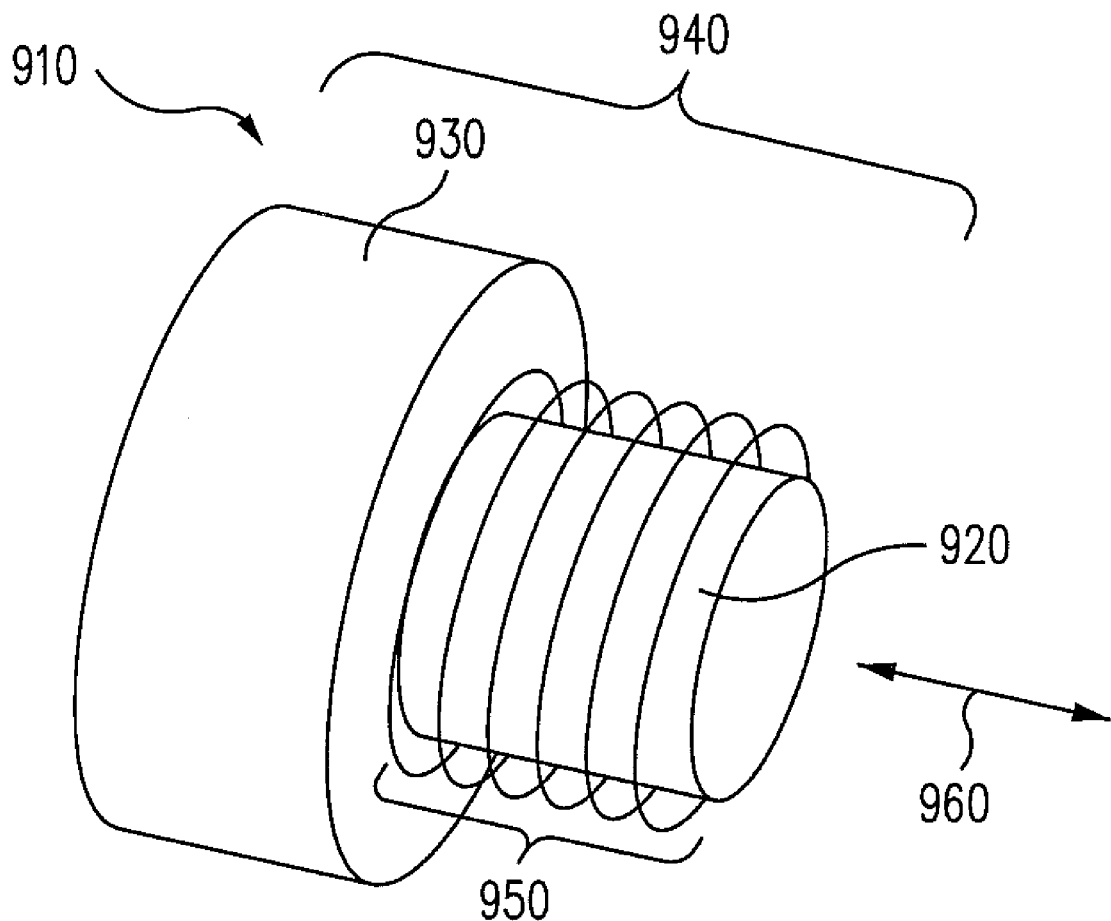
FIG. 11 illustrates a perspective view of a lens barrel with a voice coil in accordance with an embodiment of the present invention.

FIG. 11 illustrates a perspective view of a lens barrel 910 with a voice coil 950 in accordance with an embodiment of the present invention. As illustrated, lens barrel 910 includes a housing 940 having a non-uniform diameter. In particular, housing 940 includes a first section 920 and a second section 930. In various embodiments, one or both of first and second sections 920 and 930, respectively, of housing 240 may be cylindrical.

Voice coil 950 (i.e., a coiled wire) surrounds at least a portion of second section 930 and may be used as an actuator to move lens barrel 910. In particular, lens barrel 910 may be actuated through the operation of a magnetic field produced by current flowing through voice coil 950. In one embodiment, the magnetic field may interact with one or more magnets provided in or as part of second section 920. In another embodiment, the magnetic field may interact with one or more magnets external to lens barrel 910. Accordingly, by applying appropriate currents through voice coil 950, lens barrel 910 may be translated in a plurality of directions. For example, lens barrel 910 may be caused to move forward or backward in the directions denoted by arrows 960 in response to currents provided to voice coil 950.

Advantageously, because second section 920 has a diameter less than the diameter of first section 930, voice coil 950 may be provided around second section 920 without causing the external diameter of lens barrel 910 to exceed the diameter of first section 930. In various embodiments, voice coil 950 may be attached to second section 920 or alternatively may be suspended in proximity to second section 920. It will be appreciated that, in various embodiments, a plurality of voice coils 950 may be provided. In addition, it will be further appreciated that any of lens barrels 110, 210, 310, or 610, or lens carrier 810 may be implemented with one or more voice coils 950 and/or appropriate magnets as may be desired.

It will be appreciated that a lens barrel in accordance with one or more embodiments of the present invention can be provided as part of a digital camera or other personal electronic device such as a mobile telephone, a personal digital assistant (PDA), a pocket personal computer (pocket PC), a portable computer, a laptop computer, a notebook computer, or other device.

It will also be appreciated that the various lens elements discussed herein and shown in the figures are provided by way of example only, and not by way of limitation. Different lens elements, such as those having different configurations and/or different refractive powers, can be substituted for the lens elements shown or can be added to the lens elements shown. For example, the lens elements may be implemented as single element lenses or lens assemblies (i.e., compound lenses). The lens elements may be constructed from any desired material, such as plastic, glass, or other appropriate materials. In one embodiment, the lens elements are made from approximately 10 percent to approximately 15 percent glass-filled polycarbonate.

Where applicable, the various components set forth herein can be combined with each other and/or separated into subcomponents without departing from the spirit of the present disclosure.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

What is claimed is:

1. A lens barrel comprising:
   a plurality of cylindrical segments providing an external surface of the lens barrel, wherein the cylindrical segments are not nested within each other;
   a plurality of connecting members associated with each of the cylindrical segments; and
   a plurality of apertures associated with each of the cylindrical segments and corresponding to the connecting members, wherein the connecting members and the apertures are implemented to interlock with each other to cause the cylindrical segments to remain connected with each other to provide the lens barrel, wherein the lens barrel is adapted to hold a plurality of lens elements in a desired orientation, such that each of the lens elements is associated with only a corresponding one of the cylindrical segments and mounted in the corresponding one of the cylindrical segments.

2. The lens barrel of claim 1, wherein the connecting members are distributed about a circumference of the cylindrical segments.

3. The lens barrel of claim 1, wherein the apertures are provided on external surfaces of the cylindrical segments to receive the connecting members.

4. The lens barrel of claim 1, wherein the cylindrical segments are perforated to reduce the weight of the lens barrel.

5. The lens barrel of claim 1, further comprising the lens elements, wherein the lens elements are held by the lens barrel in the cylindrical segments.

6. The lens barrel of claim 1, wherein the lens barrel comprises:
   a first section having a first diameter and adapted to enclose a first one of the lens elements having a diameter approximately equal to the first diameter of the first section; and
   a second section having a second diameter greater than the first diameter.

7. The lens barrel of claim 6, wherein the second section is adapted to enclose a second one of the lens elements having a diameter approximately equal to the second diameter of the second section.

8. The lens barrel of claim 6, wherein the second section is adapted to receive a second lens element to be secured to an end of the second section, the second lens element having a diameter approximately equal to the second diameter of the second section.

9. The lens barrel of claim 6, wherein the lens barrel comprises a first plurality of threads on an external surface of the first section, wherein the first plurality of threads are adapted to engage a second plurality of threads of a mount.

10. The lens barrel of claim 1 further comprising a voice coil surrounding at least a first one of the cylindrical segments, wherein the voice coil is adapted to receive a current adapted to produce a magnetic field.

* * * * *